UNITED STATES PATENT OFFICE.

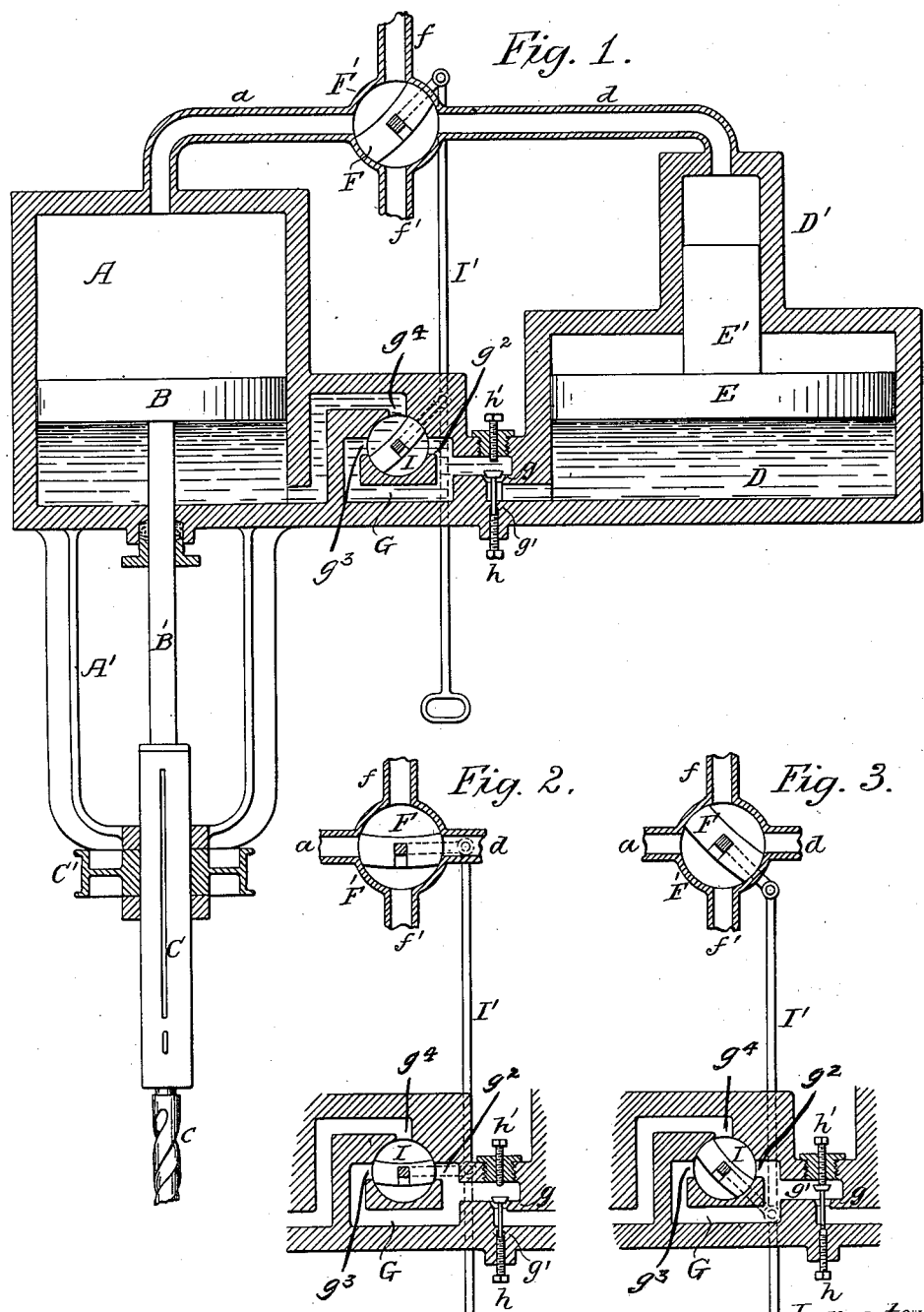

JOHN V. W. REYNDERS AND WILLARD T. SEARS, OF HARRISBURG, PENNSYLVANIA.

FLUID-PRESSURE-OPERATED TOOL.

SPECIFICATION forming part of Letters Patent No. 706,688, dated August 12, 1902.

Application filed July 17, 1901. Serial No. 68,688. (No model.)

*To all whom it may concern:*

Be it known that we, JOHN V. W. REYNDERS and WILLARD T. SEARS, citizens of the United States, and residents of Harrisburg, Pennsylvania, have invented certain Improvements in Fluid-Pressure-Operated Tools, of which the following is a specification.

Our invention relates to certain improvements in feeding devices for drills and other cutting-tools where it is desired to feed at a given pressure.

The object of our invention is to provide a fluid-pressure-feeding device which will be simple in construction and which will feed the drill or other tool steadily at any desired pressure and which will quickly return the drill or other tool, a special feature of the invention residing in the fact that the pressure in one direction is that of an inelastic fluid, while the pressure in the other direction is that of an elastic fluid.

Our invention is especially applicable to metal-drilling tools; but it will be understood that it can be applied to any tool or machine in which it is desired to feed the tool at a given pressure.

Figure 4:
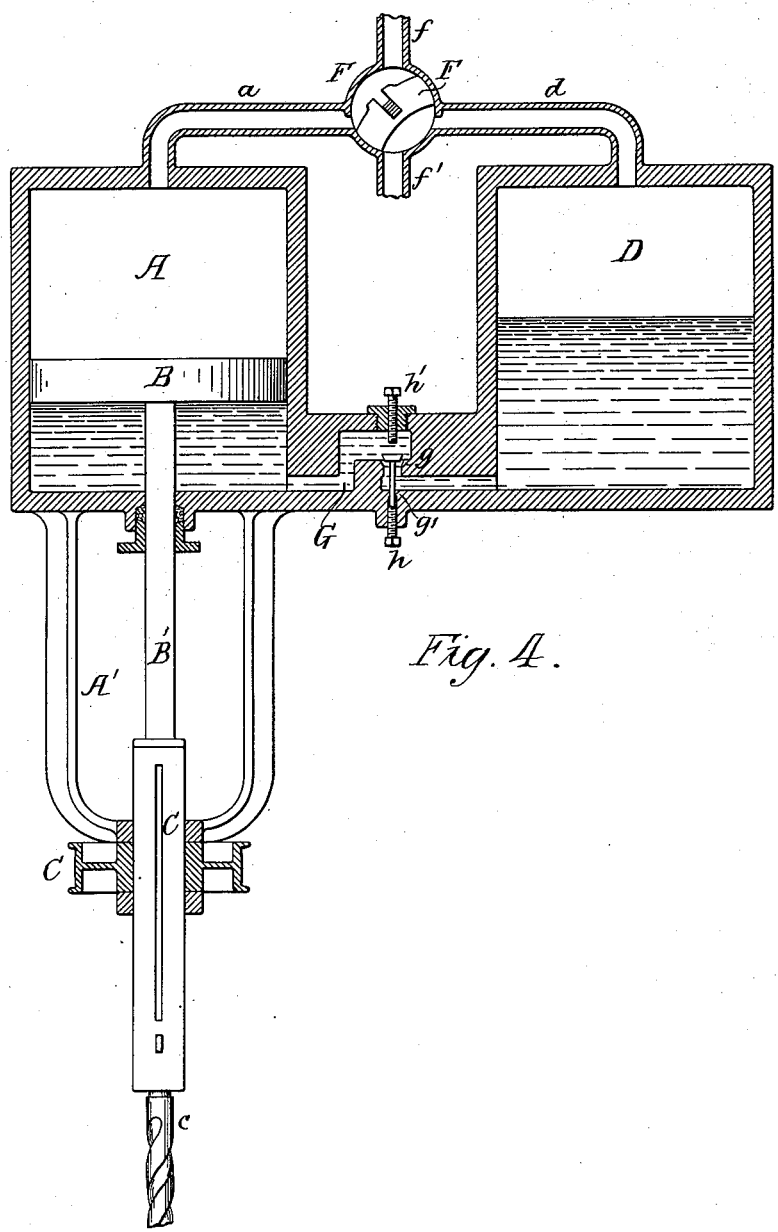
Figure 5:
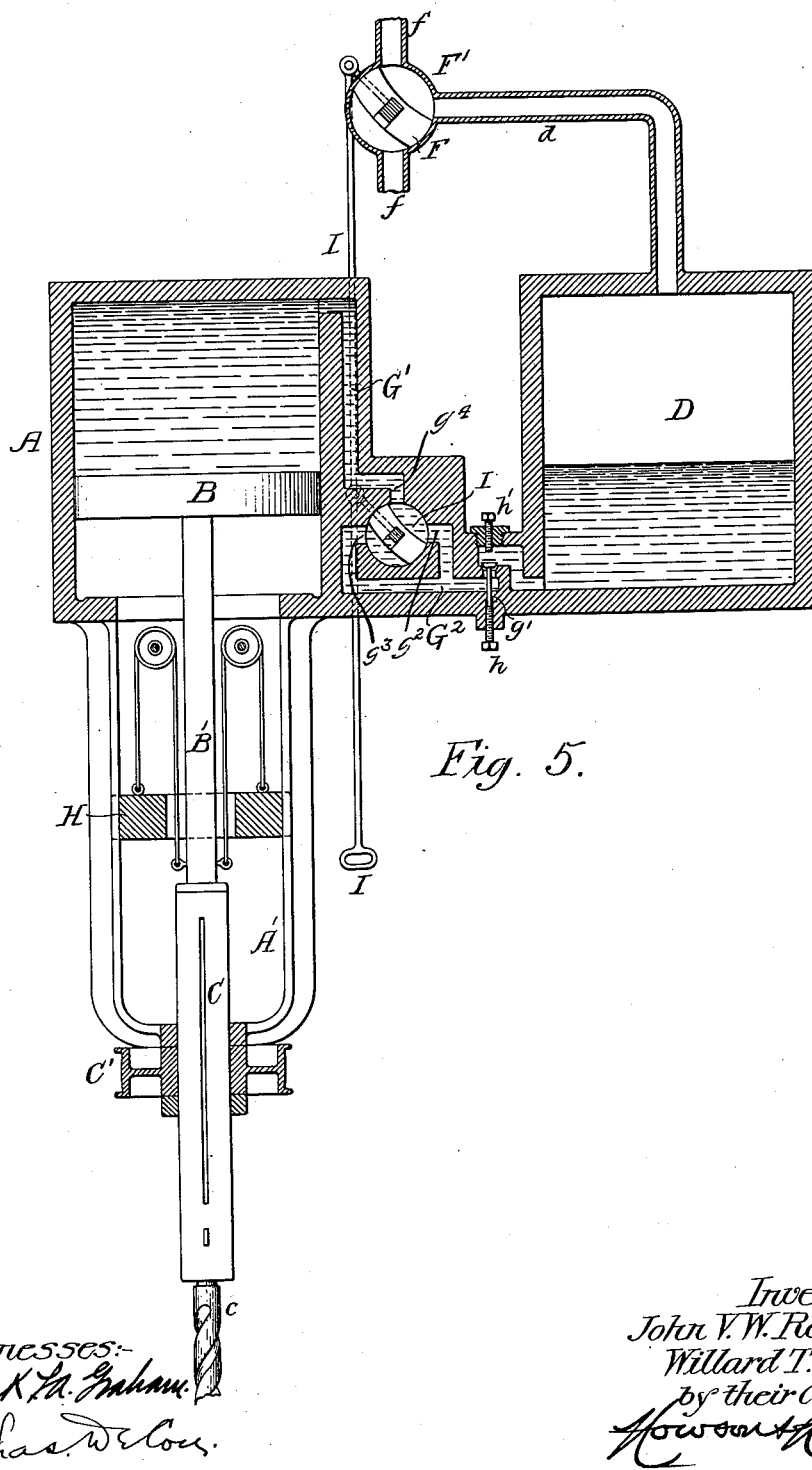

In the accompanying drawings, Figure 1 is a sectional diagram view illustrating one form of apparatus for carrying our invention into effect. Figs. 2 and 3 are diagram views showing the valves of Fig. 1 turned to different positions. Fig. 4 is a sectional diagram view showing a form of apparatus in which direct air-pressure is used to feed the tool forward and the speed is controlled by liquid, and Fig. 5 is a sectional diagram view in which the tool is fed forward directly by liquid under pressure and the tool returned by counterweight.

Referring in the first instance to Figs. 1, 2, and 3, A is a working cylinder. In this cylinder is a piston B, having a piston-rod B', connected to the spindle C. This spindle has at its lower end a drill c or other tool. In the present instance the drill-spindle C is connected to the piston-rod so that it will turn freely thereon; but its longitudinal movement is under the control of the piston and its rod. The spindle C is mounted in a frame A', which in the present instance is suspended from the working cylinder A, and a driving-pulley C' has a key which enters a spline in the spindle, whereby the spindle is rotated. The details of this part of the apparatus can be considerably modified without departing from the essential features of our invention, which relates particularly to the method of feeding the spindle to and from the work. At one side of the working cylinder A in the present instance is an oil-reservoir D. In this oil-reservoir is a piston E, and projecting from the piston is a plunger E', which enters a reduced cylindrical portion D' of the oil-reservoir, which constitutes a cylinder in which the plunger E' can work. At this point it may be well to state that the diameters of the working cylinder, reservoir, and the chamber in which the plunger E' works may be varied according to the work to be accomplished and the character and the design of the machine.

F is a controlling-valve mounted in the casing F''. A pipe $a$ extends from the valve-casing F'' to the upper portion of the working cylinder A, and another pipe $d$ extends from the upper end of the cylinder D' to the valve-casing F'' at a point directly opposite the pipe $a$. Connected to the casing is an air or fluid pipe $f$, and directly opposite the air or fluid pipe is an exhaust-pipe $f'$, the air or fluid pipe $f$ being connected to any suitable air or fluid pressure device.

The valve F is so constructed that it will either allow air or fluid to flow to the working cylinder A and open the cylinder D' to the exhaust or open the cylinder A to exhaust and the cylinder D' to air or fluid, as shown in Figs. 2 and 3.

G is a passage leading from the lower end of the reservoir D to the lower portion of the working cylinder A. In this passage is a valve-seat $g$, and a valve $g'$ is mounted to close against this seat when desired. An adjusting-screw raises the valve $g'$ from the seat $g$ to any desired extent, and a screw $h'$, mounted above the valve in the present instance, serves to limit the opening of the valve. This construction allows for a slow forward feed of the piston B and its drill, as the oil can only pass slowly between the valve $g'$ and its seat, and thence into the reservoir D; but when the piston B and its drill are retracted the valve $g'$ is forced open against the screw $h'$, so that the oil will have a free flow through the passage and the return movement can be quickly effected.

In order to stop the feed of the drill at any point, we provide a valve I, which is mounted in the passage G and can be simply a valve which will either open or close the said passage. This valve can be independently operated or may be connected to the controlling-valve F', in which case the valve I is made in the form shown in Figs. 1, 2, and 3, and the passage G has ports $g^2$ $g^3$ $g^4$ to conform to the valve, so that when the valve is in the position shown in Fig. 1 the liquid can pass from the port $g^4$ through the valve-casing to the port $g^3$, or when the valve is moved to the position shown in Fig. 2 the valve closes both ports $g^2$ and $g^3$, or when in the position shown in Fig. 3 the port $g^4$ is in communication with the port $g^2$.

We preferably connect the operating-arms of the two valves F and I by a rod I', so that the operator can move both valves through one rod.

The operation of this device is as follows: When the parts are in the position shown in Fig. 1, fluid is admitted under pressure to the working cylinder above the piston B, and the oil or other liquid is in the working cylinder A below the piston and in the reservoir D, and as pressure is applied to the piston the oil gradually escapes through the passage G into the reservoir D, the piston E being elevated, as the pipe $d$ is open to the exhaust. If it is wished to stop the movement of the piston B at any point, the valve-rod is operated to move the valves F and I to the position shown in Fig. 2, and if it is desired to return the piston the valves are moved to the position shown in Fig. 3, when the space in the working cylinder A above the piston B will be open to the exhaust, while fluid under pressure will be admitted to the cylinder D', forcing the oil from the reservoir D through the passage G into the working cylinder under the piston B, the valve $g'$ being elevated in this instance, so as to allow the oil to freely flow into the working cylinder. Thus we provide a slow forward feed during the cutting and a quick return.

In some instances the valve I may be dispensed with, as shown in Fig. 4, and the reservoir may be connected directly to the valve-chamber F', dispensing with the piston E and its plunger E'.

In Fig. 5 we have shown another modification in which the piston and its drill are returned by a counterbalance-weight H, connected by a chain to the piston-rod. In this instance instead of having air in the working cylinder above the piston B oil or other liquid is used and the passage $G^2$, communicating with the oil-reservoir, is connected to a vertical passage G', which opens into the upper portion of the working cylinder. The controlling-valve and the stop-valve of this modification are similar to those described in referring to Fig. 1 and are so designed as to operate in the same manner.

In operating the device shown in Fig. 5 the valves are turned, as shown in said figure, so as to admit oil or other liquid to the space above the piston B within the working cylinder, and as the oil passes from the reservoir to the working cylinder it can flow slowly past the valve $g'$, the valve-casing F in this case being only connected to the oil-reservoir H. When it is desired to return the piston and its tool, the valve F is turned so that the upper portion of the oil-reservoir will be open to the exhaust, when the oil will flow from the working cylinder through the passage G' $G^2$ into the oil-reservoir, and the counterweight H will quickly return the piston and its tool as the valve $g'$ is raised to its limit.

We claim as our invention—

1. The combination of a liquid-reservoir, a cylinder containing a piston, a tool operatively connected to said piston, means whereby fluid-pressure may be exerted upon liquid in the reservoir or upon the piston at will, and a structure connecting the reservoir and the cylinder whereby the liquid in the reservoir may be made to act upon the piston, substantially as described.

2. The combination of a liquid-reservoir, a cylinder containing a piston, a tool operatively connected to said piston, means whereby fluid-pressure may be exerted upon liquid in the reservoir or upon the piston at will, and a conduit connecting the reservoir and the cylinder, said conduit being provided with mechanism permitting free flow of liquid in one direction but restricting said flow when the liquid moves in an opposite direction, substantially as described.

3. The combination of a drill or other tool with a feeding device therefor, the same comprising a cylinder having within it a piston, a liquid-reservoir, means for subjecting the liquid in said reservoir to the pressure of an elastic fluid, means for operatively connecting the liquid-reservoir and the piston-cylinder whereby said liquid under the pressure of said fluid may be caused to act upon one side of the piston to move it in one direction, with means for connecting the portion of the cylinder on the other side of the piston with the source of fluid under pressure, whereby said piston may be moved in the opposite direction, the said tool being free to turn independently of the piston, substantially as described.

4. The combination of a drill or other tool, with a feeding device therefor comprising a cylinder with piston therein, fluid-pressure apparatus and communication between said fluid-pressure apparatus and the piston-cylinder, said communication presenting a restricted area to flow in one direction and a greater area to flow in the opposite direction, substantially as described.

5. The combination of a drill or other tool, with a feeding device therefor comprising a cylinder with piston therein, a liquid-reservoir, means for subjecting the liquid in said reservoir to the pressure of an elastic fluid, a communication between said liquid-reservoir at one side of the piston and means for exerting the pressure of the elastic fluid directly upon the other side of the piston, substantially as described.

6. The combination of a drill or other tool with a feeding device therefor comprising a cylinder having in it a piston means for exerting fluid-pressure upon said piston to move the tool, and an automatic valve in the fluid-pressure-supply pipe whereby the area of said pipe is normally restricted when the fluid-pressure is exerted in one direction, but is open to its full extent when pressure is exerted in the opposite direction, substantially as described.

7. The combination of a drill or other tool with a feeding device consisting of a piston and a cylinder therefor, fluid-pressure apparatus, means for operatively connecting said fluid-pressure apparatus and the piston-cylinder, and a valve for use in connection with said means, said valve being constructed to be automatically moved by changes in the direction of flow of the fluid under pressure, being thereby made to occupy two extreme positions, one of which restricts the flow of said fluid to a greater extent than the other, substantially as described.

8. The combination of a drill or other tool with a working cylinder, a piston in said cylinder to which the tool is attached, a reservoir, means for connecting the reservoir and the working cylinder, an automatic valve within said means, means for maintaining the valve at any desired distance off its seat, and means for limiting the upward movement of the valve, an air-pressure pipe communicating with the reservoir, substantially as described.

9. The combination of a working cylinder, a piston therein, a tool connected to the said piston, an oil-reservoir, a passage forming communication between the lower portion of the oil-reservoir and the lower portion of the working cylinder, a valve in said passage, means for adjusting said valve, a controlling-valve, a casing therefor, a pipe leading from said casing to the upper end of the working cylinder, and a pipe leading from the casing to the upper end of the reservoir, an exhaust-pipe and an air-pressure pipe communicating with the valve-casing, substantially as described.

10. The combination of a working cylinder, a piston therein connected to the drill or other tool to be operated, an oil-reservoir, a passage forming communication between the oil-reservoir and the working cylinder, a cylinder mounted above the oil-reservoir, a piston in the oil-reservoir and having a plunger working in the cylinder, a valve-casing, a controlling-valve therein, a pipe leading from the valve-casing to the upper portion of the working cylinder, and a pipe leading from the valve-casing to the upper portion of the plunger-cylinder, an air-pipe and exhaust-pipe communicating with the valve-casing, substantially as described.

11. The combination of a working cylinder, a piston therein connected to the drill or other tool to be operated, an oil-reservoir, a passage forming communication between the oil-reservoir and the working cylinder, a cylinder mounted above the oil-reservoir, a piston in the oil-reservoir, and having a plunger working in the cylinder, a valve-casing, a controlling-valve therein, a pipe leading from the valve-casing to the upper portion of the working cylinder, and a pipe leading from the valve-casing to the upper portion of the plunger-cylinder, an air-pipe and exhaust-pipe communicating with the valve-casing, with a stop-valve in the passage leading from the working cylinder to the reservoir, substantially as described.

12. The combination of the working cylinder, a piston therein, a rod, a tool connected to said rod, a reservoir for liquid, a passage leading from the liquid-reservoir to the working cylinder, a valve in said passage for limiting the flow of liquid through the passage, a stop-valve also in the passage, a controlling-valve casing, a valve therein, a pipe leading from the valve-casing to the liquid-reservoir, the stop-valve and controlling-valve being connected so as to operate in unison, substantially as described.

13. The combination of a drill or other tool with a feeding device therefor, said device including a cylinder and a piston within the same operatively connected to said tool, means for exerting fluid-pressure on one side of the piston, means for controlling the flow of fluid from the portion of the cylinder on the other side of the piston, and a normally open valve constructed to automatically open to a greater or less extent as the direction of flow of fluid through it is changed, substantially as described.

In testimony whereof we have signed our names to this specification in the presence of two subscribing witnesses.

JOHN V. W. REYNDERS.
WILLARD T. SEARS.

Witnesses:
  WM. C. ARMOR,
  MARY E. HAUER.